United States Patent
Swaine et al.

(10) Patent No.: US 6,780,015 B2
(45) Date of Patent: Aug. 24, 2004

(54) NIGHT VISION GOGGLES TRAINING SYSTEM

(75) Inventors: Steven D. Swaine, St. Charles, MO (US); Harold R. Streid, Salt Lake City, UT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/992,663

(22) Filed: Nov. 14, 2001

(65) Prior Publication Data

US 2003/0091961 A1 May 15, 2003

(51) Int. Cl.[7] ............................ F41A 33/00; G09B 19/16
(52) U.S. Cl. .............................. 434/44; 434/11; 434/29; 434/36; 434/41; 345/7; 345/8; 345/9; 345/757; 359/894
(58) Field of Search ............................. 434/29, 36, 44; 345/757, 7–9, 3.2, 600, 603; 348/216, 217, 29, 30, 33, 164; 359/894, 618

(56) References Cited

U.S. PATENT DOCUMENTS

| | | | | |
|---|---|---|---|---|
| 5,413,483 A | * | 5/1995 | Witt, III | .................... 434/11 |
| H1599 H | * | 10/1996 | Task et al. | .................... 348/33 |
| 6,196,845 B1 | * | 3/2001 | Streid | .................... 434/44 |
| 6,301,050 B1 | * | 10/2001 | DeLeon | .................... 359/618 |
| 2002/0012008 A1 | * | 1/2002 | Takagi | .................... 345/691 |
| 2002/0024495 A1 | * | 2/2002 | Lippert et al. | .................... 345/98 |
| 2002/0075210 A1 | * | 6/2002 | Nestorovic et al. | .................... 345/87 |
| 2002/0087296 A1 | * | 7/2002 | Wynn | .................... 703/8 |
| 2002/0130982 A1 | * | 9/2002 | Marshall | .................... 349/15 |

* cited by examiner

Primary Examiner—Teresa Walberg
Assistant Examiner—Cameron Saadat
(74) Attorney, Agent, or Firm—Shimokaji & Associates, P.C.

(57) ABSTRACT

A training system and method for use of simulated night vision goggles (NVG) which provides the full dynamic range of NVG simulation including low intensity, medium intensity and high intensity irradiance images of night-time terrain. Each of three 12-bit video signals are allocated to a preselected portion or all of the total irradiance range representing scene elements corresponding to low, medium and high light intensity and a video camera scans and converts the resultant generated image to preserve its resolution and dynamic range. The image is viewable in the simulated goggles.

19 Claims, 1 Drawing Sheet

NIGHT VISION GOGGLES TRAINING SYSTEM

BACKGROUND OF THE INVENTION

This invention relates to a training system and method for implementing the system, and more particularly, a system and method for training aircrew pilots in the use of night vision goggles.

The training of aircrew pilots in the use of night vision goggles (NVG) is typically conducted in a classroom setting through the use of courseware and instructional videos, supplemented by ground-based training simulators. Training simulators equipped with NVG apparatus allow pilots to train in more realistic environments under task-loaded conditions. The available technology and associated costs limited the fidelity and application of such ground-based NVG simulation.

There are two traditional technical approaches to NVG training in a simulator. The first is known as the stimulated approach, in which the pilot wears actual NVG flight hardware in the training simulator and the goggles are stimulated using a visual display system and digital image generator. The second approach is known as simulation, in which the pilot wears a head-mounted display (HMD) driven by an image generator and digital post processing system.

In the stimulated approach, infrared (IR) projectors (or sometimes just red CRTs and appropriate filters) are used to stimulate actual NVG. The projectors must have sufficient power and dynamic range to provide the full range of irradiance at the entrance pupil of the NVG thus emulating actual environment radiant power reflecting diffusely off natural terrain under all phases of the moon. Sufficient dynamic range is provided through a combination of video gray scale quantization and a separate projector dynamic gain control and optical filters to reproduce dark overcast night to full moon and clear night. For multi-screen display systems, this complex projector system must be replicated for each screen. This approach does not however, provide sufficient irradiance to provide the additional dynamic range (on the order of 120 DB) needed to reproduce effects produced by the direct viewing of bright lights, explosions or flares, so some of these effects need to be simulated in the image generator. Furthermore, for high fidelity NVG terrain simulation it is necessary that the image generator render the night scene using a physics based, radiometrically correct reflectance model based on a high fidelity lunar and atmospheric model.

The display is viewed directly by the NVG through the green notch filter of the NVG in the same manner as in the aircraft. This provides a stable image which is not displaced from the aircraft boresight by even slight head movements and does not appear to "swim" or "jitter" as it does when the image is produced on helmet, e.g., in a HMD system, by mixing this video with simulated NVG imagery. The image produced by NVG stimulation through the display projector is also significantly more stable than when simulated NVGs are used. This is because the image is produced off the helmet, as it is in the real world.

A further significant disadvantage of this approach is that the entire environment must be "light tight" to prevent spurious light from reaching the goggles.

In the simulated approach, just as in the stimulated approach, a high-fidelity physics-based, NVG terrain simulation image generator and database are used to render the night scene using a physics-based, radiometrically correct lunar and atmospheric reflectance model. The principal difference between the simulated and stimulated approaches is that in the simulated approach actual NVGs are not used and the sensor effects are simulated in a video post processor for display on helmet-mounted CRTs constructed to resemble NVGs. The video post processor computes the average intensity value of the scene in the instantaneous field of view. It then uses this data, along with the information on lunar and atmospheric conditions, to set gain and to inject the appropriate level of scintillation noise into the video signal provided to the simulated NVG display. The gain and noise level appropriate to the simulated nighttime scene are calibrated according to empirical data gathered by observation of actual NVG as used in the real world. Halos around intense light sources must be simulated in size and other qualitative effects in the image generator in the same manner as described for the simulated approach.

The simulated NVG cannot view the direct or head up display (HUD) directly, so a simulated HUD model must be used to generate HUD video that is mixed with simulated NVG video for display on the simulated NVG display. This HUD presentation is subject to "swim", which may be distracting. Also, the use of helmet-mounted displays has never been widely accepted by the training community due to complex human factors issues.

SUMMARY OF THE INVENTION

Accordingly, this invention relates to a training system for teaching the use of night vision goggles including a means for generating high fidelity, infrared, terrain simulation images, and means in communication with the image generation means for providing sufficient irradiance to increase the dynamic range needed to reproduce effects to simulate direct viewing of bright lights such as produced by explosions and flares, and more particularly to increase the dynamic range needed to reproduce effects to simulate direct viewing of bright lights.

In another aspect of the present invention, a method for simulating night vision as seen through a pair of goggles comprises the steps of: a. providing a pair of simulated goggles; b. generating a high fidelity, infrared, terrain simulation image viewable in the goggles; c. simulating the entire range of natural night time terrain irradiance, and d. scan converting the resultant image generated to video for display through the simulated goggles.

This invention relates specifically to a training system and method in the use of night vision goggles with a proposed hybrid of the simulation and stimulation approaches, which eliminates the need for the complex post processing hardware/software required by the stimulation approach and the complex projection system required by the simulation approach. The present approach is also unique in that it provides the full dynamic range of NVG simulation. The stimulation of actual NVG is performed off-helmet and the resulting image in the NVG eyepiece is scan-converted to video for on-helmet display on simulated goggles or projected on a display screen using an area of interest display system.

Multiple IR CRTs with combining optics and appropriately weighted neutral density filters provide the stimulation. Each CRT is driven by successively higher order bytes of digital video so that up to 200 DB dynamic range of irradiance (10×order of magnitude) is provided to an NVG image intensifier tube. The NVG and associated stimulation apparatus are packaged in a "light tight" package with appropriate light baffles and optical coatings to limit light scatter so as to maintain contrast. This is possible because the higher intensity sources, which must be imaged onto the light intensifier, are typically point sources, which, although very intense, do not add excessive amounts of radiance to the light path. Halos, scintillation, noise and automatic gain control (AGC) effects are produced in the goggle image intensifier and are 100% faithful to the NVG physics because actual NVGs are used. Each of three 12-bit video signals are allocated to the appropriate portion of the total irradiance range according to the scene elements which they represent, as follows:

Low Intensity: Natural terrain irradiance resulting from starlight, moonlight and other natural night sky irradiators Medium Intensity: Distant and/or low intensity radiators such as aircraft lights, stars, moon, distant cultural lights High Intensity: Close and/or high intensity radiators such as beacons, flares, missile firing, explosions The entire range of natural night-time terrain irradiance is assigned to one of the three video signals, the other two are used to represent the full range of natural and artificial radiators when directly viewed by NVG and for light reflected from intense artificial sources. The image generator allocates point radiators and extended area reflectors of especially powerful irradiators to the proper video signal by a dynamic assignment process based on a computation of radiated power, distance from the simulated eyepoint and atmospheric attenuation. The output of the NVG image intensifier is scan converted by a high resolution 12 bit video camera to preserve its resolution and dynamic range.

BRIEF DESCRIPTION OF THE DRAWINGS

The SOLE FIGURE is a schematic, flow chart illustrating the night vision training system and method of the present invention.

DETAILED DESCRIPTION OF THE INVENTION

Figure 1:
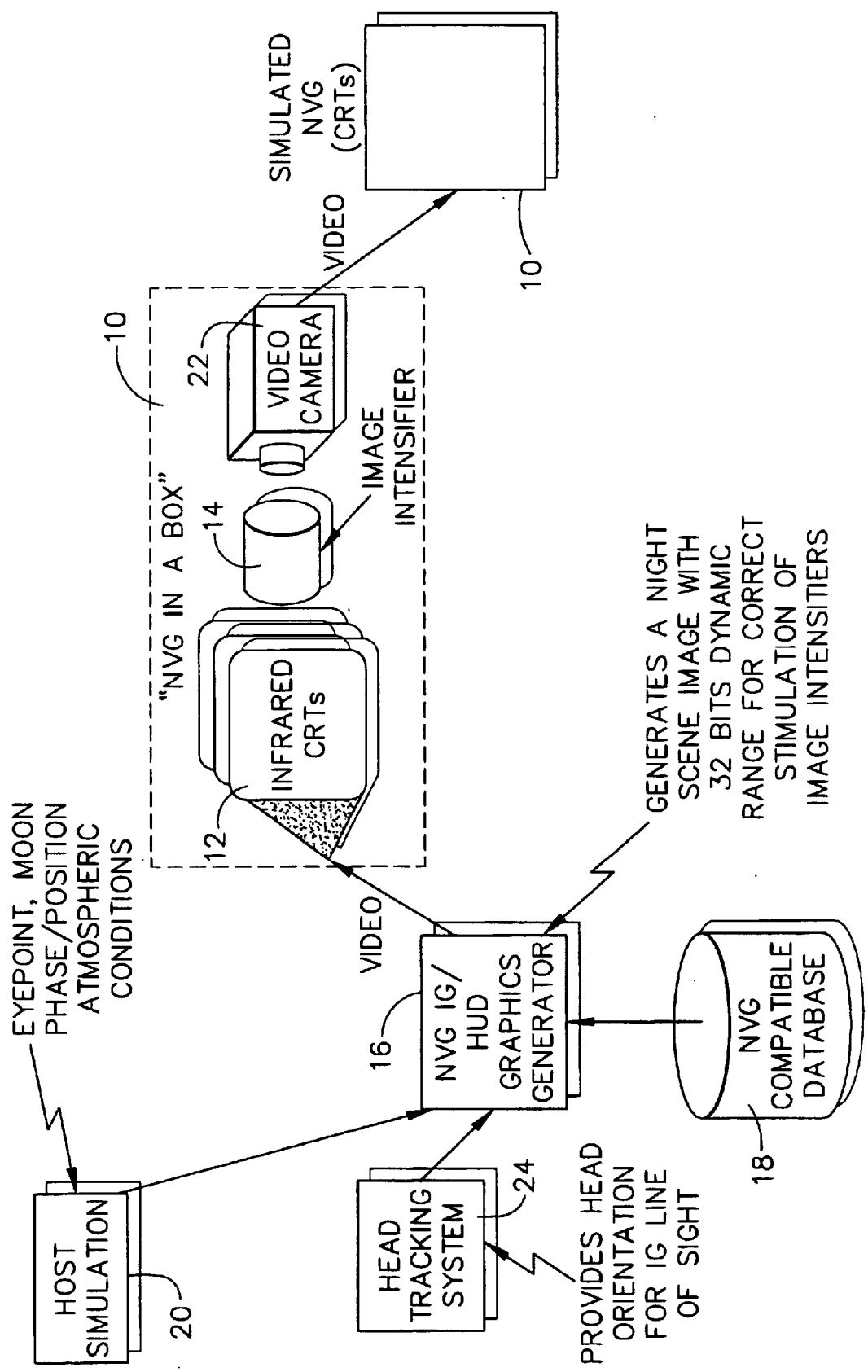

Referring now to the drawing in detail, the "NVG in a Box" 10, is worn by a pilot being trained. The NVG (night vision goggles) receive images generated by multiple IR (infrared) CRTs (computer radiated terrain images) with combining optics and appropriately weighted neutral density filters to provide stimulation. The stimulation of actual NVG is performed off-helmet and the resulting image in the NVG eyepiece is scan-converted to video for on-helmet display on simulated goggles. Alternatively, the display can be projected on a screen using a high resolution projector.

Each CRT 12 in the NVG apparatus 10 is driven by successively higher order bytes of digital video so that up to 200 DB dynamic range of irradiance (10 orders of magnitude) is provided to a NVG image intensifier tube 14. The NVG and associated stimulation apparatus 10 are packaged in a light tight package with appropriate light baffles and optical coatings to limit light scatter so as to maintain contrast. This is possible because the higher intensity sources, which must be imaged onto the light intensifier 14, are typically point sources, which, although very intense, do not add excessive amounts of radiance to the light path. Halos, scintillation, noise and AGC (Automatic gain control) effects are produced in the goggle image intensifier 14 and are 100% faithful to the NVG physics because actual NVG IG (image generator)/HUD (head-up display) graphics 16 from a NVG compatible database 18 are used and fed to apparatus 10.

Each of three 12-bit video signals are allocated to the appropriate portion of the total irradiance range according to the scene elements which they represent, as indicated in the following table:

| Irradiance Range | Scene Element |
| --- | --- |
| Low intensity | Natural terrain irradiance resulting from Starlight, moonlight and other natural night sky irradiators |
| Medium intensity | Distant and/or low intensity radiators such as aircraft light, stars, moon, distant cultural lights |
| High intensity | Close and/or high intensity radiators such as beacons, flares, missile firing, explosions |

The entire range of natural nighttime irradiance is assigned to one of the three video signals, which are fed from the host simulator 20 to the graphics generator 16; while the other two signals are used to represent the full range of natural and artificial radiators when directly viewed by NVG and for light reflected from intense artificial sources. The image generator 16 allocates point radiators and extended area reflectors of especially powerful irradiators to the proper video signal by a dynamic assignment process based on a computation of radiated power, distance from the simulated eyepoint and atmospheric attenuation.

The output of the image intensifier 14 is scan converted by a high resolution 12 bit video camera 22 to preserve its resolution and dynamic range. A head tracking system 24 is used to provide a signal to the IG graphics generator 16 sensing the head orientation of the pilot undergoing training for the proper orientation of IG line of sight. This provides a stable HUD (heads-up display) image which is not displaced from the aircraft boresight by even slight head movements and does not appear to "swim" or "jitter", since the signal generated is viewed directly by the NVG in the same manner as in the aircraft.

It should be understood, of course, that the foregoing relates to preferred embodiments of the invention and that modifications may be made without departing from the spirit and scope of the invention as set forth in the following claims.

We claim:

1. A training system for teaching the use of night vision goggles comprising:

a. a pair of simulated night vision goggles;

b. an image generation system generating three separate high fidelity, infrared, computer radiated terrain images, each computer radiated terrain image allocated to a portion of a total dynamic range of irradiance and driven by successively higher order bytes of digital video, wherein said image generation system includes a graphics generator, and wherein said image generation system is separate from said pair of simulated night vision goggles providing off-helmet image generation;

c. a second system in communication with said image generation system including weighted neutral density filters that optically combine the outputs of said three infrared computer radiated terrain images and said second system providing each of said computer radiated terrain images simultaneously to stimulate an image intensifier tube to provide about 200 dB dynamic range of irradiance and to provide sufficient dynamic range of irradiance to said image intensifier tube to simulate direct viewing of bright lights; and d. a third system for scan converting a resulting image generated at the output of said image intensifier tube for display on said simulated goggles including a high-resolution video camera to preserve the resolution and dynamic range of said image.

2. The training system in accordance with claim 1 including said third system for scan converting said resulting image generated at the output of said image intensifier tube for projecting said image on a display screen using said high-resolution video camera.

3. The training system in accordance with claim 1 wherein said second system includes:

an allocation system allocating each of said three infrared computer radiated terrain images to a preselected portion or all of the total irradiance range representing scene elements of low, medium and high light intensity.

4. The training system in accordance with claim 1 including a head tracking system for providing a stable image to said graphics generator of said image generation system regardless of the simulated night vision goggle line of sight.

5. The training system in accordance with claim 1 wherein said image generation system and said second system are provided in a light tight package to maintain contrast, wherein said light tight package includes light baffles and optical coatings, and wherein said light tight package is separate from said simulated goggles.

6. A training system for teaching the use of night vision goggles comprising:

a. a pair of simulated night vision goggles;

b. an image generation system generating high fidelity, infrared, terrain simulation images and providing three separate 12-bit video signals as inputs, wherein said system is separate from said simulated goggles;

c. a second system in communication with said image generation system including multiple infrared computer radiated terrain images, each of said infrared computer radiated terrain images being driven by a distinct one of said three 12-bit video signals, wherein each of said three 12-bit video signals is allocated to a portion of a total dynamic range of irradiance and said second system providing each of said infrared computer radiated terrain images simultaneously to stimulate an image intensifier tube to provide about 200 dB dynamic range of irradiance and to provide sufficient dynamic range of irradiance to said image intensifier tube to simulate the entire range of natural nighttime terrain irradiance including bright lights; and d. a third system for scan converting a resulting image generated at the output of said image intensifier tube for display on said simulated goggles including a high-resolution video camera to preserve the resolution and dynamic range of said image.

7. A training system in accordance with claim 6 including said third system for scan converting said resulting image generated at the output of said image intensifier tube and projecting said image on a display screen using said high-resolution video camera.

8. A training system in accordance with claim 6 wherein said communication system includes:

an allocation system allocating each output of said three 12-bit video signals to a preselected portion or all of the total irradiance range representing scene elements of low, medium and high light intensity.

9. A training system in accordance with claim 6 including a head tracking system for providing a stable image regardless of the simulated night vision goggle line of sight.

10. A training system for teaching the use of night vision goggles comprising:

a. a pair of simulated night vision goggles;

b. an image generation system generating three separate high fidelity, infrared, computer radiated terrain images and providing three separate 12-bit video signals as inputs, each of said computer radiated terrain images being driven by a distinct one of said three 12-bit video signals, wherein each of said three 12-bit video signals is allocated to a portion of a total dynamic range of irradiance, wherein said image generation system includes a graphics generator, and wherein said image generation system is separate from said pair of simulated night vision goggles providing off-helmet image generation;

c. a second system in communication with said image generation system including weighted neutral density filters that optically combine the outputs of said three 12-bit video signals and said second system providing each of said computer radiated terrain images simultaneously to stimulate an image intensifier tube to provide about 200 dB dynamic range of irradiance and to provide sufficient dynamic range of irradiance to said image intensifier tube to reproduce effects to simulate direct viewing of bright lights, said second system including an allocation system allocating each output of said three 12-bit video signals to a preselected portion or all of the total irradiance range representing scene elements of low, medium and high light intensity;

d. a high-resolution video camera for scan converting the resultant image at the output of said image intensifier tube to preserve its resolution and dynamic range and to display said image on said simulated goggles; and e. a head tracking system for providing a stable image regardless of the simulated night vision goggle line of sight;

said image generation system and said second system are provided in a light tight package to maintain contrast.

11. A training system in accordance with claim 10 including a video system displaying the resultant image generated at the output of said image intensifier tube on a display server.

12. A method for simulating night vision as seen through a pair of goggles comprising the steps of:

a. providing a pair of simulated night vision goggles, b. generating three separate high fidelity, infrared, computer radiated terrain images, off-helmet separate from said simulated goggles, c. driving each computer radiated terrain image by successively higher order bytes of digital video allocated to different portions of a total dynamic range of irradiance d. optically combining each of said three computer radiated terrain images to simultaneously stimulate an image intensifier tube to provide about 200 dB dynamic range of irradiance;

e. simulating the entire range of natural night time terrain irradiance including bright lights using said three computer radiated terrain images, and f. scan converting the resultant image generated to video for display through said simulated goggles.

13. The method of claim 12 wherein said scan conversion includes the steps of:

a. allocating each output of said three infrared computer radiated terrain images to a preselected portion of the total irradiance range representing scenic elements of low, medium and high light intensity, b. scanning the converted image to preserve its resolution and dynamic range.

14. The method of claim 13 including the step of:

rendering the generated image stable regardless of the simulated night vision line of sight.

15. The method of claim 14 including the step of:

maintaining contrast of said generated image.

16. The method of claim 15 including the step of:

maintaining the contrast of said generated image by providing the generating image in a light tight package.

17. The method of claim 12 including the step of:

rendering the generated image stable regardless of the simulated night vision line of sight.

18. The method of claim 12 including the step of:

maintaining contrast of said generated image.

19. The method of claim 18 including the step of:

maintaining the contrast of said generated image by providing the generating image in a light tight package.

* * * * *